(12) United States Patent
Romain et al.

(10) Patent No.: US 7,806,319 B2
(45) Date of Patent: Oct. 5, 2010

(54) SYSTEM AND METHOD FOR PROTECTION OF DATA CONTAINED IN AN INTEGRATED CIRCUIT

(75) Inventors: Fabrice Romain, Rians (FR); Alain Pomet, Rousset (FR)

(73) Assignee: STMicroelectronics SA, Montrouge (FR)

( * ) Notice: Subject to any disclaimer, the term of this patent is extended or adjusted under 35 U.S.C. 154(b) by 1130 days.

(21) Appl. No.: 11/402,650

(22) Filed: Apr. 11, 2006
(Under 37 CFR 1.47)

(65) Prior Publication Data
US 2007/0043993 A1    Feb. 22, 2007

(30) Foreign Application Priority Data
Apr. 11, 2005    (FR)    .................................. 05 50924

(51) Int. Cl.
*G06K 5/00*    (2006.01)
*G06K 7/08*    (2006.01)
*G06K 19/06*    (2006.01)

(52) U.S. Cl. .................. 235/380; 235/375; 235/382; 235/451; 235/492; 711/163; 711/164

(58) Field of Classification Search ................. 235/375, 235/380, 451, 492; 711/163, 164
See application file for complete search history.

(56) References Cited

U.S. PATENT DOCUMENTS

| | | | | |
|---|---|---|---|---|
| 5,841,866 A | * | 11/1998 | Bruwer et al. ................. | 705/66 |
| 6,126,070 A | * | 10/2000 | Fukuzumi .................... | 235/380 |
| 6,247,151 B1 | | 6/2001 | Poisner | |
| 6,792,528 B1 | * | 9/2004 | Hou .............................. | 380/57 |
| 2002/0002654 A1 | * | 1/2002 | Tomohiro .................... | 711/103 |
| 2003/0200448 A1 | * | 10/2003 | Foster et al. ................. | 713/189 |

FOREIGN PATENT DOCUMENTS

| WO | WO 99/35554 | 7/1999 |
|---|---|---|
| WO | WO 2005/027462 | 3/2005 |

OTHER PUBLICATIONS

French Search Report, FR0550924, Feb. 14, 2006.
Hagai, Bar, et al., The Sorcerer's Apprentice Guide to Fault Attacks, [Online], XP002329915, May 7, 2004.
Heidelberg, Ralph, LCD Module Technical Reference (FAQ), [Online], XP002346546, Feb. 18, 2001.
8051+LCD+EPROM, [Online], XP002346547, URL:http:??www.ustr.met/lcd001.shtml, Sep. 23, 2005.

* cited by examiner

*Primary Examiner*—Thien Minh Le
*Assistant Examiner*—Tuyen K Vo
(74) *Attorney, Agent, or Firm*—Lisa K. Jorgenson; Paul F. Ruayn; Graybeal Jackson LLP

(57) ABSTRACT

A method and a circuit for protecting an integrated circuit against an extraction of data read from at least one memory, comprising the steps of comparing each data word to be output from the integrated circuit with at least one value stored in this circuit, and generating an error signal in case of an identity between the value and the data waiting to be output.

20 Claims, 1 Drawing Sheet

SYSTEM AND METHOD FOR PROTECTION OF DATA CONTAINED IN AN INTEGRATED CIRCUIT

PRIORITY CLAIM

The present application claims the benefit of French Patent Application No. 05/50924, filed Apr. 11, 2005, which application is incorporated herein by reference in its entirety.

BACKGROUND

Technical Field

Embodiments of the present invention generally relate to electronic circuits and, more specifically, to the protection of data contained in an integrated circuit against an extraction of the data after injections of faults in the circuit operation. Embodiments of the present invention more specifically relate to smart cards and to the protection of the confidential data that they contain.

BACKGROUND

FIG. 1 is a block diagram illustrating an example of a simplified architecture of an integrated circuit 1, for example, of a smart card, of the type to which embodiments of the present invention apply.

Circuit 1 comprises a central processing unit 11 (CPU) associated with a program memory 12 (ROM) generally of read-only memory type, one or several data memories 13 (MEM), and an input/output circuit 14 (I/O) enabling data exchange outside of circuit 1. The different elements communicate over one or several data, address, and control buses 15. Memory or memories 13 may be of any type (rewritable or not non-volatile memory, RAM, etc.) or a combination of several types of memories.

Among possible attacks performed by persons attempting through fraud to extract confidential data from the chip (for example, the secret code), embodiments of the present invention apply to so-called differential fault analysis attacks (DFA) which comprises the disturbing (PERTURB) of the operation of component 1, for example, by means of a radiation (laser, infrared, X-rays, etc.) or by other means (for example, by acting on the component power supply).

Some integrated circuits comprise software tools for detecting such disturbances by a checking of the correct execution of programs. For example, the same instructions are executed twice and it is checked whether they lead to the same results, or a signature calculation is performed on data extracted from memory 13.

A category of particularly efficient disturbances comprises the directional disturbing (orientation of a radiation, for example) of the peripheral circuits (address decoder) of memory 13 during an order for reading from an authorized area of this memory. The term "authorized area" is used to designate an area from which the data are allowed to come out of the integrated circuit, conversely to those of "protected" areas containing confidential data that must remain inside of circuit 1. Disturbing, for example, the memory address decoder (assumed to be contained in block 13) enables jumping from an authorized memory area to a protected area. Since the executed order then is an order to read from the authorized memory, the hacker is likely to recover the critical data if it were not for access control mechanisms to detect this access violation. For example, in case of a control of the address present on bus 15 by the central processing unit, the address is correct since the disturbance only intervenes in the peripheral area of memory 13. Software protection systems are most often ineffective against this type of fraud.

A problem is to detect such a disturbance. Once the disturbance has been detected, many solutions exist according to applications, either to block the component, or to prevent the outputting of critical data, etc.

Another disadvantage of "software" solutions is that they take execution time from the capacity of the central processing unit.

SUMMARY

Embodiments of the present invention aim at overcoming all or part of the disadvantages of known systems for protecting an integrated circuit against possible frauds by fault injection in the circuit operation.

An embodiment of the present invention more specifically aims at providing a solution which enables detecting a disturbance of the address decoder of a memory of the circuit.

An embodiment of the present invention also aims at avoiding use of the central processing unit to perform the detection.

According to one embodiment of the present invention, a method for protecting an integrated circuit against an extraction of data read from at least one memory comprises the steps of:
comparing each data word to be output from the integrated circuit with at least one value stored in this circuit; and
generating an error signal in case of an identity between the value and the data waiting to be output.

According to an embodiment of the present invention, the value is stored at several locations in the memory at addresses which are not likely to be requested by programs providing data to the outside of the circuit.

According to an embodiment of the present invention, the value is stored in an element distinct from the memory.

According to an embodiment of the present invention, the value is stored in non-volatile fashion, preferably, by hardware writing.

According to an embodiment of the present invention, the address of a data word to be read from the memory to be provided to the outside of the circuit is compared with at least one address stored in the circuit, the error signal being generated in case of an identity between the two addresses.

Another embodiment of the present invention provides an integrated circuit comprising at least a central processing unit, a memory, an input/output circuit, and at least one circuit comprising at least one element for storing a first data word and a comparator of a second data word, provided by an internal bus, with respect to the first word.

According to an embodiment of the present invention, the detection circuit comprises means for generating an error signal in case of an identity between the data words.

According to an embodiment of the present invention, an address storage element is contained in the detection circuit.

An embodiment of the present invention also provides a smart card containing an integrated circuit.

The foregoing and other features and advantages of the present invention will be discussed in detail in the following non-limiting description of specific embodiments in connection with the accompanying drawings.

DETAILED DESCRIPTION

Figure 1:
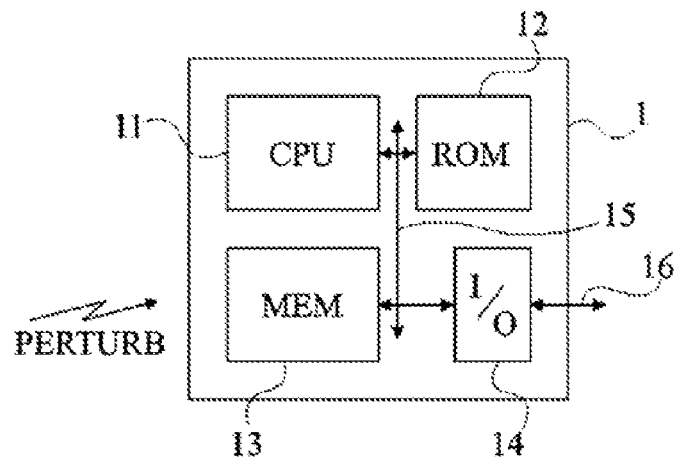
FIG. 1, previously described, very schematically shows in the form of blocks an example of a simplified architecture of a conventional integrated microcontroller of the type to which embodiments of the present invention apply.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

The same elements have been designated with the same reference numerals in the different drawings. For clarity, only those elements which are useful to the understanding of the present invention have been shown in the drawings and will be described hereafter. In particular, the exploitation of the possible fraud detection has not been detailed, embodiments of the present invention being compatible with the exploitation conventionally made of fraud attempt detection. Further, reference will be made to term "data" to designate any digital information, be it actual data or information of a program.

Figure 2:
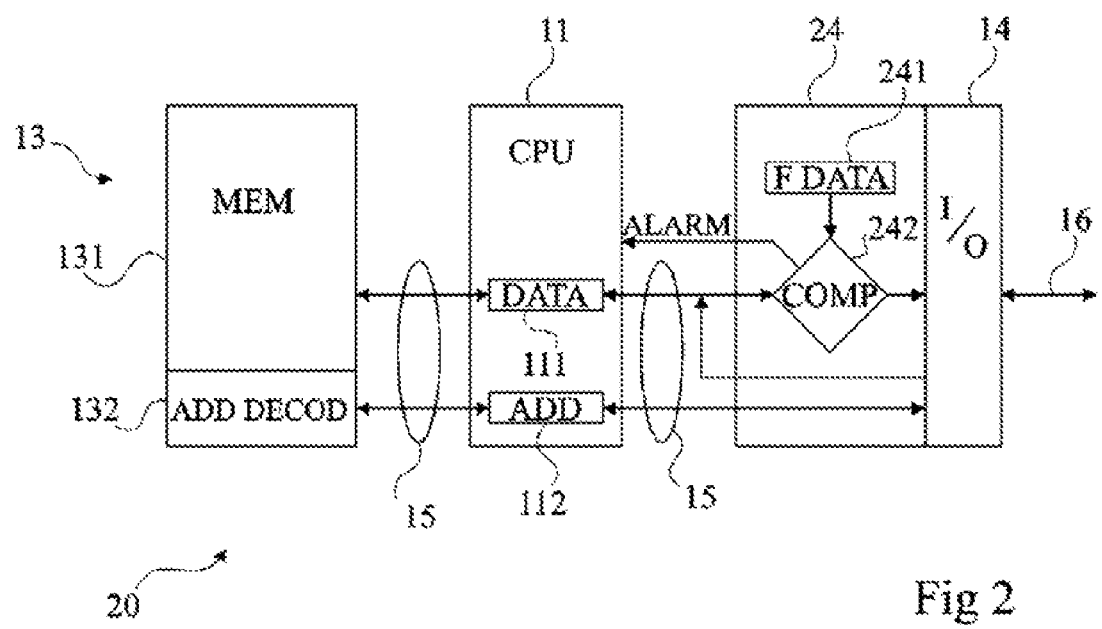
FIG. 2 very schematically shows in the form of blocks a circuit for detecting fraud attempts according to an embodiment of the present invention.

FIG. 2 illustrates an integrated circuit 20 according to an embodiment of the present invention. Circuit 20 is, for example, contained in a smart card.

As previously, an integrated circuit of the type to which embodiments of the present invention apply comprises a central processing unit 11 (CPU), one or several memories 13 here symbolized by a memory plane 131 (MEM) and its address decoder 132 (ADD DECOD), and an input/output circuit 14 (I/O). The circuit 20 also comprises a program memory (12, FIG. 1). The program memory has not been illustrated in FIG. 2 since this embodiment of the present invention also protects against a fraud attempt by disturbance of the operation of this program memory to extract confidential information therefrom (for example, a native key, written on manufacturing of the circuit). Embodiments of the present invention will thus be discussed in relation with the example of a memory 13, but it applies to any memory integrated in the circuit 20 which is desired to be protected. Unit 11 comprises (or is associated with), conventionally, a data register 111 and an address register 112 for temporarily storing and controlling the memory operation.

According to the embodiment of FIG. 2, circuit 20 comprises a circuit 24 for detecting an attempt of output of protected data. This circuit comprises an element 241 (FDATA) for storing one or several words (for example, over 64 bits) of data forming "forbidden" values, that is, which are considered as indicating a fraud attempt, and an element 242 for comparing the word(s) contained in element 241 with a data word extracted from memory 13 and provided, for example, by register 111.

According to this embodiment of the present invention, forbidden values are stored, for example, on circuit initialization, on manufacturing thereof, or at any other appropriate time for the desired operation, in memory 131 at addresses not likely to be called in normal operation, or not likely to be called by input/output programs for exchange with the outside.

Thus, if an address jump linked to a disturbance (incidental or wanted) of the component causes the extraction of one of the forbidden words, the word is detected by comparator 242 which generates a signal ALARM, for example, intended for central unit 11 to take the appropriate measurements (for example, blocking of the component, reset, etc.). Signal ALARM preferably forms a priority-holding interrupt for the central processing unit. As a variation, signal ALARM directly resets the circuit.

Preferably, the forbidden words are stored in memory 131 at the limits of ranges of this memory containing information to be protected. This enables detecting a fraud attempt by sequential reading.

According to an embodiment of the present invention, the forbidden values contained in register 241 and in memory 131 are programmable by the user. Such an embodiment enables guaranteeing that the forbidden values are not likely to correspond to authorized data, since the user knows the data likely to be stored in the memory plane.

As a variation, the forbidden values are selected to have a low probability of being present in authorized data (for example, a train of 0s or a train of 1s), which enables them to be definitively stored on manufacturing.

According to another embodiment of the present invention, forbidden addresses are stored in a register (not shown) of circuit 24 to be compared with addresses ADD contained in register 112 of the data extracted from the memory to be output. Such an embodiment may be combined with the former and adds an additional security by allowing detection of an addressing towards a protected memory area.

An advantage of embodiments of the present invention is that they enable detecting an attempt to output data considered as having to be protected, be this attempt voluntary (fraud attempt) or incidental (circuit malfunction).

Another advantage of embodiments of the present invention is that this detection is performed to the nearest point of the input/output circuit, which improves the system reliability.

According to a preferred embodiment where the comparison with the forbidden data or addresses is performed by a circuit distinct from central processing unit 11, this embodiment of the present invention further has the advantage of not requiring cycle time from the central processing unit to perform the detection.

Of course embodiments of the present invention are likely to have various alterations, improvements, and modifications which will readily occur to those skilled in the art. In particular, although the present invention has been more specifically described with an example of application to smart cards, it more generally applies to all circuits integrating a memory and a central processing unit, the memory containing data likely to be allowed to be output from the circuit and other data considered as having to remain inside of the circuit.

Further, the practical implementation of embodiments of the present invention is within the abilities of those skilled in the art based on the functional indications given hereabove, be it in software or hardware form, by using known tools.

Moreover, the processings to be applied in case of a fraud attempt detection by the method or circuit of embodiments of the present invention depend on the application and may take any form.

Finally, although the present invention has been described in relation with a preferred embodiment of a circuit integrating the central processing unit, the memory, and the input/output circuit, it also applies to the case where all or part of those elements are distinct circuits, provided that the assembly can be considered as a protected circuit, that is, where the buses of communication between elements are not accessible.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for protecting an integrated circuit against an extraction of data read from at least one memory, comprising the steps of:
    comparing each data word to be output from the integrated circuit with at least one value stored in this circuit, each value being stored in the memory at an address which is not likely to be requested by programs providing data to the outside of the circuit;
    determining whether identity exists between each value and each data word waiting to be output; and
    generating an error signal if identity is determined to exist.

2. The method of claim 1, wherein said value is stored in an element distinct from said memory.

3. The method of claim 2, wherein said value is stored in non-volatile fashion.

4. The method of claim 1, wherein the address of a data word to be read from the memory to be provided to the outside of the circuit is compared with at least one address stored in the circuit, said error signal being generated if identity between the two addresses is determined.

5. A method of protecting data stored in an integrated circuit against undesired output of that data from the integrated circuit, the method comprising:
    storing at least one value in the integrated circuit, each value being stored at a plurality of locations in the integrated circuit with each location being a location that is unlikely to be accessed during the output of data from the integrated circuit;
    for data to be output from the integrated circuit, comparing the data to at least one value stored in the integrated circuit; and
    when the operation of comparing indicates the data equals one of the stored values, prohibiting the output of the data from the integrated circuit.

6. The method of claim 5, wherein the data being compared to the predetermined values comprises an address associated with a data word stored in the integrated circuit.

7. The method of claim 6, wherein the data being compared comprises both the address and the data word, with the address being compared to predetermined address values and the data word being compared to predetermined data word values.

8. The method of claim 5, wherein prohibiting the output of the data word from the integrated circuit includes generating an error signal.

9. The method of claim 5, wherein each location comprises non-volatile memory storage location.

10. A method of protecting data stored in an integrated circuit against undesired output of that data from the integrated circuit, the method comprising:
    storing at least one value in the integrated circuit, each value being stored at a plurality of locations in the integrated circuit with each location being a location that is unlikely to be accessed during the output of data from the integrated circuit;
    for data to be output from the integrated circuit, comparing the data to at least one value stored in the integrated circuit;
    when the operation of comparing indicates the data equals one of the stored values, prohibiting the output of the data from the integrated circuit; and
    wherein the values stored in the integrated circuit have predetermined values determined by a user of the integrated circuit.

11. The method of claim 5, wherein each value is stored in an element distinct from said memory.

12. An integrated circuit, comprising:
    a processor;
    a memory coupled to the processor, the memory operable to store data words; and
    an input/output circuit coupled to the processor, the input/output circuit operable to compare data words received from the memory via the processor to at least one prohibited value, each prohibited value being stored in a plurality of storage locations in the integrated circuit and the input/output circuit operable to prevent the data word from being output from the integrated circuit responsive to the data word being equal to one of the prohibited values.

13. An integrated circuit, comprising:
    a processor;
    a memory coupled to the processor, the memory operable to store data words;
    an input/output circuit coupled to the processor, the input/output circuit operable to compare data words received from the memory via the processor to at least one prohibited value, each prohibited value being stored in a plurality of storage locations in the integrated circuit and the input/output circuit operable to prevent the data word from being output from the integrated circuit responsive to the data word being equal to one of the prohibited values; and
    wherein the input/output circuit comprises:
        at least one storage element, each storage element storing a respective prohibited value; and
        a comparator coupled to each storage element and to the processor, the comparator coupled to receive data words from the processor and operable to compare the data words to the prohibited values in the storage elements and to generate an alarm signal responsive to the data word being equal to any of the prohibited values.

14. The integrated circuit of claim 13, wherein the storage element and comparator are physically positioned adjacent circuitry in the input/output circuitry that outputs data words from the integrated circuit.

15. The integrated circuit of claim 13, wherein each data word stored in the memory has an associated address and wherein the prohibited values include prohibited address values, and wherein the comparator is further operable to compare the address of each data word to the prohibited address values and to generate the alarm signal responsive to the address being equal to any of the prohibited address values.

16. The integrated circuit of claim 12, wherein the integrated circuit is embodied in a smart card.

17. The integrated circuit of claim 16, wherein the smart card is a telephone calling or electronic cash payments smart card.

18. The integrated circuit of claim 12, wherein the input/output circuit includes storage locations and the prohibited values are stored in these storage locations in the input/output circuit.

19. The integrated circuit of claim 18, wherein the prohibited values have values with a low probability of occurring in other data words stored in the memory.

20. The integrated circuit of claim 12, wherein the prohibited values are stored in storage locations in the memory.

* * * * *